(12) United States Patent
Jeong et al.

(10) Patent No.: US 11,691,383 B2
(45) Date of Patent: *Jul. 4, 2023

(54) DISPLAY DEVICE

(71) Applicant: Samsung Display Co., Ltd., Yongin-Si (KR)

(72) Inventors: Hana Jeong, Busan (KR); Yougyoung Lee, Changwon-si (KR); Jihwa Lee, Hwaseong-si (KR); Sunhaeng Cho, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 329 days.

This patent is subject to a terminal disclaimer.

(21) Appl. No.: 16/952,540

(22) Filed: Nov. 19, 2020

(65) Prior Publication Data

US 2021/0187904 A1 Jun. 24, 2021

(30) Foreign Application Priority Data

Dec. 24, 2019 (KR) ........................ 10-2019-0173804

(51) Int. Cl.
| | |
|---|---|
| *B32B 7/12* | (2006.01) |
| *B32B 3/04* | (2006.01) |
| *B32B 17/10* | (2006.01) |
| *C09J 7/29* | (2018.01) |
| *C09J 7/38* | (2018.01) |
| *G02B 1/14* | (2015.01) |
| *G02B 1/18* | (2015.01) |
| *B32B 27/06* | (2006.01) |
| *B32B 27/08* | (2006.01) |
| *B32B 27/28* | (2006.01) |

(52) U.S. Cl.
CPC ................. *B32B 7/12* (2013.01); *B32B 3/04* (2013.01); *B32B 17/10* (2013.01); *C09J 7/29* (2018.01); *C09J 7/385* (2018.01); *G02B 1/14* (2015.01); *G02B 1/18* (2015.01); *B32B 2255/10* (2013.01); *B32B 2457/20* (2013.01)

(58) Field of Classification Search
None
See application file for complete search history.

(56) References Cited

U.S. PATENT DOCUMENTS

| | | | |
|---|---|---|---|
| 10,074,701 B2 | 9/2018 | Jeong et al. | |
| 10,216,230 B2 | 2/2019 | Kim et al. | |
| 2009/0087650 A1* | 4/2009 | Inoue | C09J 7/385 526/260 |
| 2016/0037657 A1* | 2/2016 | Yoshizumi | G09F 9/301 361/679.01 |

(Continued)

FOREIGN PATENT DOCUMENTS

| | | |
|---|---|---|
| KR | 1020150088101 A | 7/2015 |
| KR | 1020170109746 A | 10/2017 |

(Continued)

*Primary Examiner* — Ramsey Zacharia
(74) *Attorney, Agent, or Firm* — Cantor Colburn LLP

(57) ABSTRACT

A display device includes a display module foldable along a folding axis, and a protective tape including a base film and an adhesive layer, wherein the adhesive layer has a storage modulus of less than about 0.3 MPa at about −20° C. and a creep value of about 100% or greater when a shear stress of about 2000 Pa is maintained for about 10 minutes at about 60° C.

20 Claims, 10 Drawing Sheets

(56) References Cited

U.S. PATENT DOCUMENTS

2017/0309867 A1    10/2017  Mun et al.
2018/0150105 A1     5/2018  Hwang et al.
2020/0123408 A1 *   4/2020  Bu ......................... C08G 63/91
2020/0224061 A1     7/2020  Oh et al.

FOREIGN PATENT DOCUMENTS

| KR | 1020170121037 A | 11/2017 |
| KR | 1020180018925 A | 2/2018 |
| KR | 1020180061564 A | 6/2018 |
| KR | 1020180096449 A | 8/2018 |
| KR | 1020200088536 A | 7/2020 |

* cited by examiner

DISPLAY DEVICE

This application claims priority to Korean Patent Application No. 10-2019-0173804, filed on Dec. 24, 2019, and all the benefits accruing therefrom under 35 U.S.C. § 119, the content of which in its entirety is herein incorporated by reference.

BACKGROUND

1. Field

The disclosure herein relates to a display device, and more particularly, to a flexible display device including a protective tape.

2. Description of the Related Art

A display device displays various images on a display screen to provide information to a user. In general, a display device displays information in an allotted screen. Recently, a flexible display device including a flexible display panel, which is foldable or bendable, is being developed. The flexible display device may be folded, rolled, or bent unlike a rigid display device. The flexible display device, the shape of which may be variously changed, may be portable regardless of the original screen size thereof, and thus improving user convenience.

SUMMARY

In a flexible display device, a protective tape may be provided to protect a display surface thereof. However, when stress is repeatedly applied to a folding portion or a bending portion in such a flexible display device, the protective tape may be deformed or damaged.

The disclosure provides a display device attached with a protective tape capable of maintaining high adhesion force and durability even after repeated folding and being removed without leaving any residues when being detached.

The disclosure also provides a display device including a protective tape having high adhesive properties against a window surface even after repeated folding.

An embodiment of the invention provides a display device including a display module foldable along a folding axis, and a protective tape disposed on the display module, where the protective tape includes a base film and an adhesive layer disposed between the base film and the display module. In such an embodiment, the adhesive layer has a storage modulus of less than about 0.3 megapascal (MPa) at about −20° C. and a creep value of about 50% or greater when a shear stress of about 2000 pascal (Pa) is maintained for about 10 minutes at about 60° C.

In an embodiment, the display module may include a display panel, and a window disposed on the display panel, where the window may include a polymer film, the adhesive layer may be disposed on the window, and the storage modulus of the adhesive layer may be less than about 0.1 MPa and the creep value thereof may be about 100% or greater.

In an embodiment, the window may further include a hard coating layer disposed on the polymer film, and the adhesive layer may be disposed directly on the hard coating layer.

In an embodiment, an initial adhesion force of the protective tape to the window may be about 200 gram-force per inch (gf/inch) or greater, where the initial adhesion force may be an adhesion force value measured when about 30 minutes have elapsed after the protective tape is attached to the window at a room temperature.

In an embodiment, a first high-temperature adhesion force of the protective tape to the window may be about 200 gf/in or greater, where the first high-temperature adhesion force may be an adhesion force value measured when about 10 minutes have elapsed after the protective tape is attached to the window at about 60° C.

In an embodiment, a second high-temperature adhesion force of the protective tape to the window may be less than about 100 gf/in, where the second high-temperature adhesion force may be a peel force value measured when the protective tape is detached from the window at about 80° C.

In an embodiment, a maintenance adhesion force of the protective tape to the window and a detachment adhesion force of the protective tape to the window may satisfy the following relation: (Detachment adhesion force)/(Maintenance adhesion force)<0.5, where the maintenance adhesion force may be either adhesion force measured when about 30 minutes have elapsed after the protective tape is attached to the window at a room temperature or adhesion force measured when about 30 minutes have elapsed after the protective tape is attached to the window at a first temperature, and the detachment adhesion force may be a peel force measured when the protective tape is detached from the window at a second temperature, where the first temperature is in a range of about 25° C. to about 70° C., and the second temperature is in a range of about 50° C. to about 80° C.

In an embodiment, the display module may include a display panel; and a window disposed on the display panel, where the window may include a glass substrate having a thickness of about 300 micrometers (μm) or less.

In an embodiment, the window may further include a fingerprint prevention layer disposed on the glass substrate, and an initial adhesion force of the protective tape to the window may be about 20 gf/in or greater, where the initial adhesion force may be an adhesion force value measured within about 30 minutes after the protective tape is attached to the window at a room temperature.

In an embodiment, a detachment adhesion force of the protective tape to the window may be less than about 200 gf/in, where the detachment adhesion force may be a peel force value measured when the protective tape is detached from the window at about 80° C.

In an embodiment, a thickness of the adhesive layer may be in a range of about 25 μm to about 30 μm.

In an embodiment, a thickness of the base film may be in a range of about 30 μm to about 60 μm.

In an embodiment, the adhesive layer may include at least one of a silicon-based resin, an acrylic resin, or a urethane-based resin.

In an embodiment, the adhesive layer may further include an adhesion force control agent.

In an embodiment, the base film may include at least one of polyethyleneterephthalte ("PET"), poly(butylene terephthalate) ("PBT"), polyethylene naphthalene ("PEN"), polycarbonate ("PC"), poly(methylmethacrylate) ("PMMA"), polystyrene ("PS"), polyvinylchloride ("PVC"), polyethersulfone ("PES"), polypropylene ("PP"), polyamide ("PA"), modified polyphenylene ether ("m-PPO"), polyoxymethylene ("POM"), polysulfone ("PSU"), polyphenylene sulfide ("PPS"), polyimide ("PI"), polyethyleneimine ("PEI"), polyether ether ketone ("PEEK"), polyamide imide ("PAI"), polyarylate ("PAR"), or thermoplasitc polyurethane ("TPU").

In an embodiment, the display device may be foldable in an in-folding manner or an out-folding manner along the folding axis.

In an embodiment, the display module and the protective tape may be folded with a radius of curvature in a range of about 1 millimeter (mm) to about 5 mm along the folding axis.

In an embodiment of the invention, a display device foldable along a folding axis includes a display panel, a window disposed on the display panel and including a polymer film, and a protective tape disposed on the window, where the protective tape includes a base film and an adhesive layer disposed between the base film and the window, where the adhesive layer has a storage modulus of less than about 0.1 MPa at about −20° C. and a creep value of about 100% or greater when a shear stress of about 2000 Pa is maintained for about 10 minutes at about 60° C.

In an embodiment, the window may further include a hard coating layer disposed on the polymer film, and the adhesive layer may be disposed directly on the hard coating layer.

In an embodiment, a maintenance adhesion force of the protective tape to the window and a detachment adhesion force of the protective tape to the window may satisfy the following relation: (Detachment adhesion force)/(Maintenance adhesion force)<0.5, where the maintenance adhesion force may be either adhesion force measured when about 30 minutes have elapsed after the protective tape is attached to the window at a room temperature or adhesion force measured when about 30 minutes have elapsed after the protective tape is attached to the window at a first temperature, and the detachment adhesion force may be an adhesion force measured when the protective tape is detached from the window at a second temperature, where the first temperature may be in a range of about 25° C. to about 70° C., and the second temperature may be in a range of about 50° C. to about 80° C.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
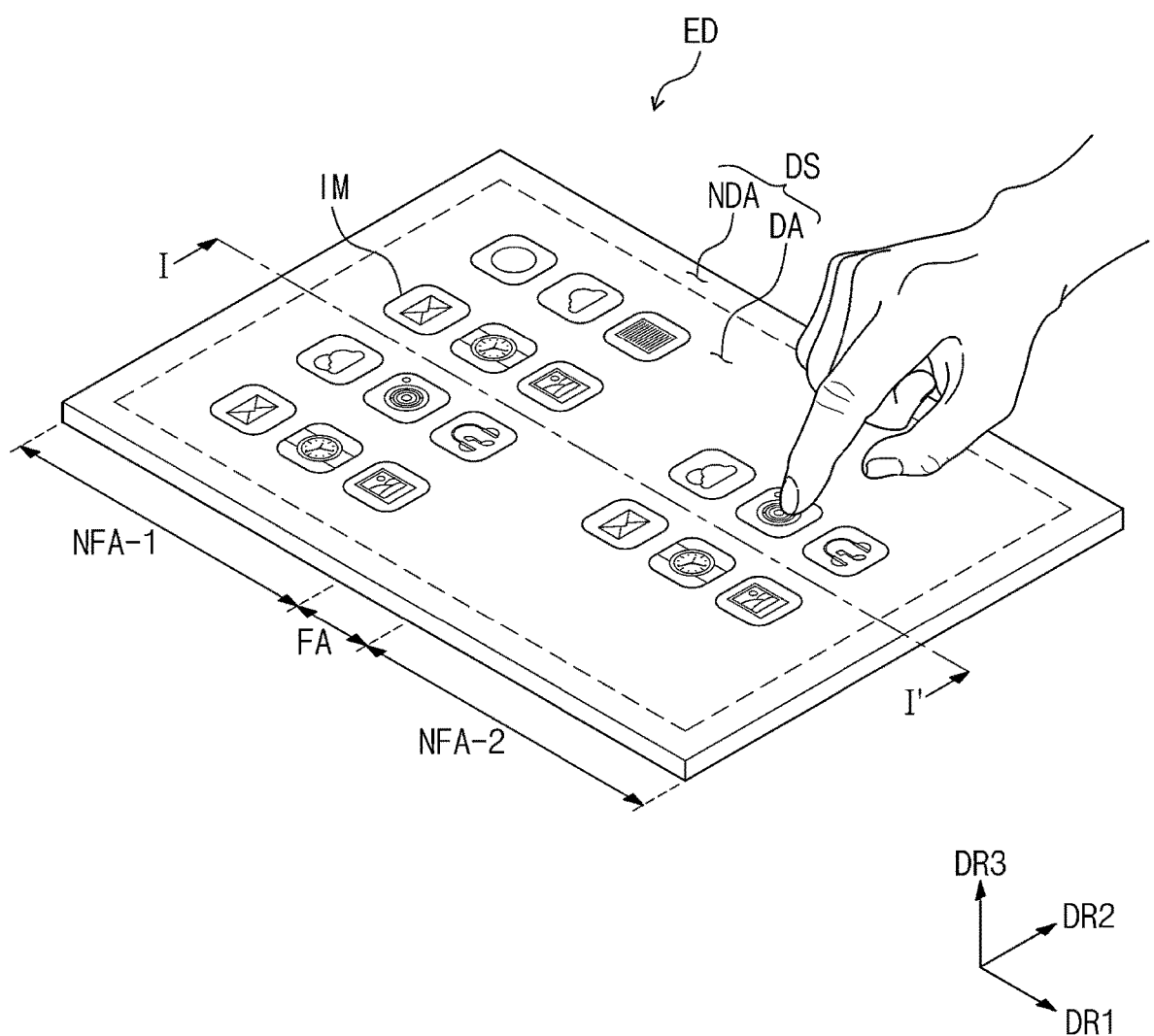
FIG. 1 is a perspective view of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element (or a region, a layer, a portion, etc.) is referred to as being "on," "connected to," or "coupled to" another element, it means that the element may be directly disposed on/connected to/coupled to the other element, or that a third element may be disposed therebetween. In contrast, when an element is referred to as being "directly on," "connected directly to," or "coupled directly to" another element, there are no intervening elements present.

Meanwhile, in the present disclosure, being "directly disposed" means that there is no layer, film, region, plate or the like added between a portion of a layer, a film, a region, a plate or the like and other portions. For example, being "directly disposed" may mean being disposed without additional members such as an adhesive member between two layers or two members.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the invention. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings. In the present disclosure, being "disposed on" may not only include the case of being disposed on an upper portion of any one member but also the case of being disposed on a lower portion thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the invention pertains. It is also to be understood that terms defined in commonly used dictionaries should be interpreted as having meanings consistent with the meanings in the context of the related art, and are interpreted as being expressly defined herein unless they are interpreted in an ideal or overly formal sense.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a display device according to the invention will be described in detail with reference to the accompanying drawings.

Figure 2:
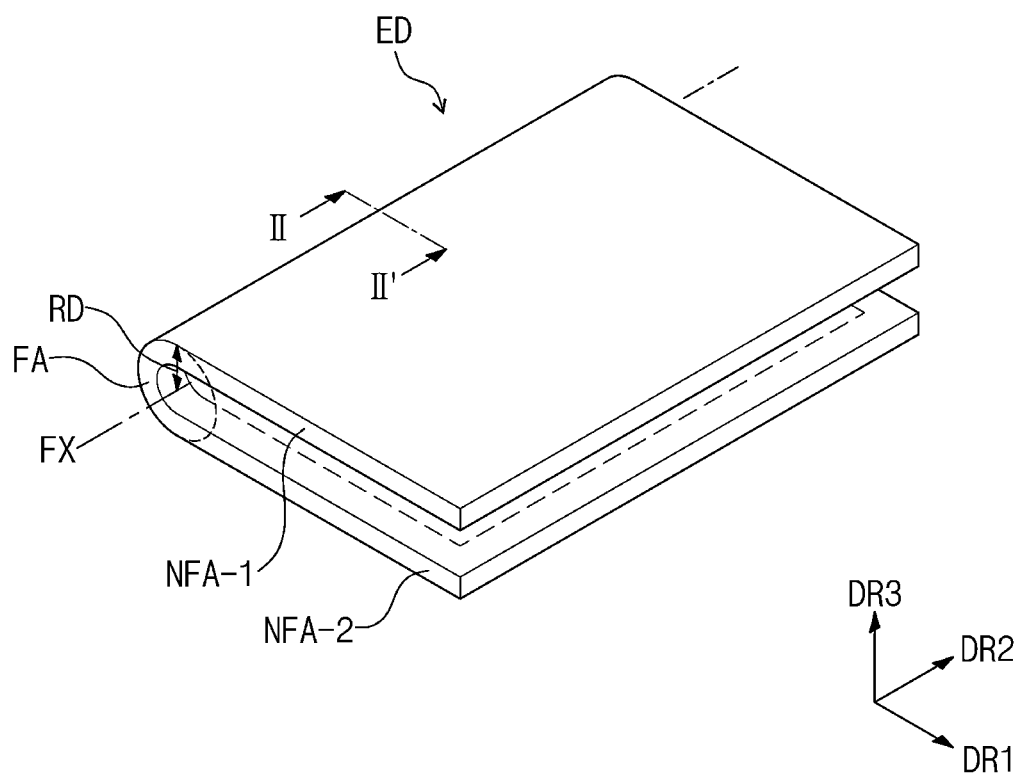
FIG. 2 is a view illustrating the display device shown in FIG. 1 in a folded state.
Figure 3:
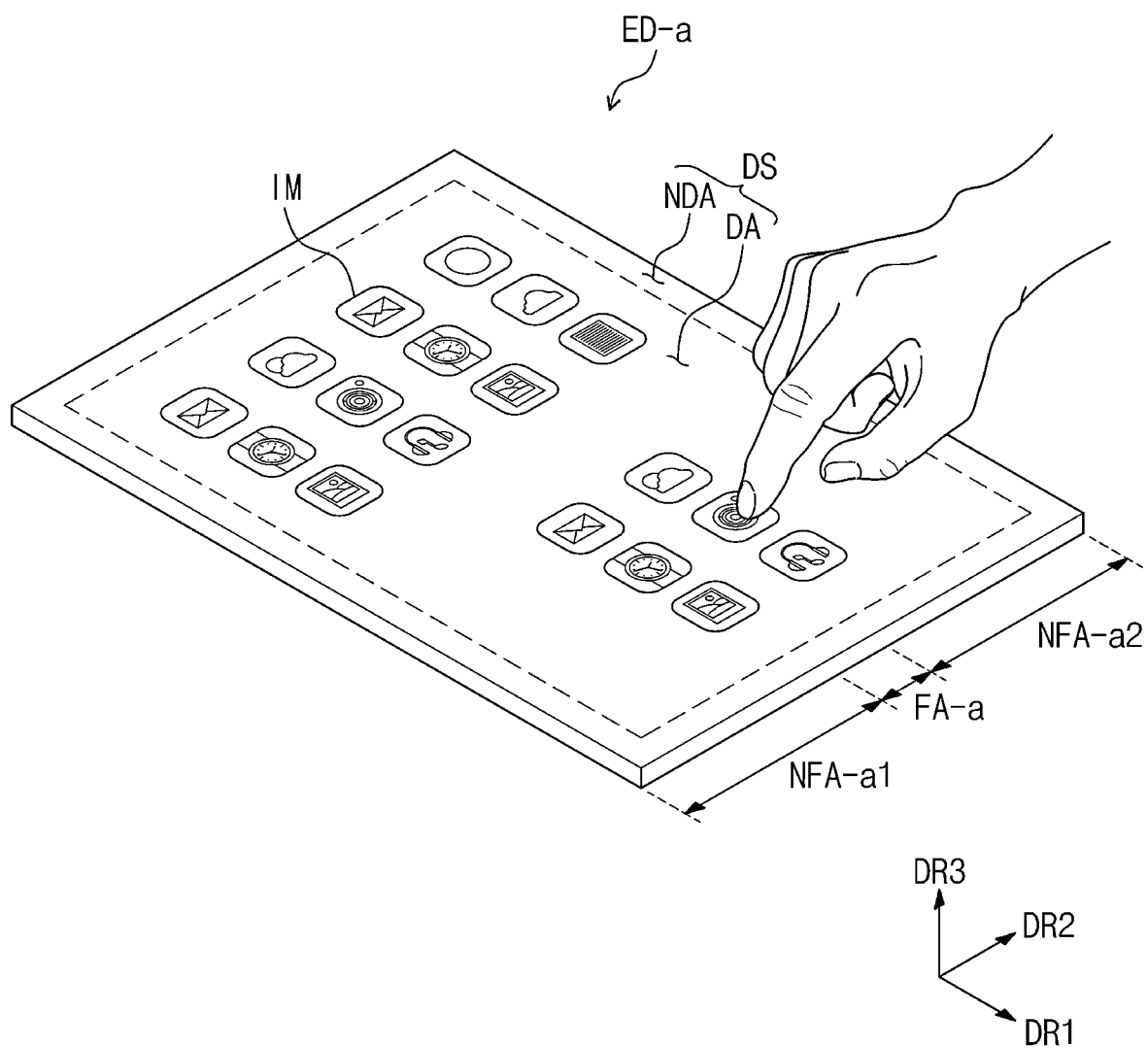
FIG. 3 is a perspective view of a display device according to an alternative embodiment of the invention.
Figure 4:
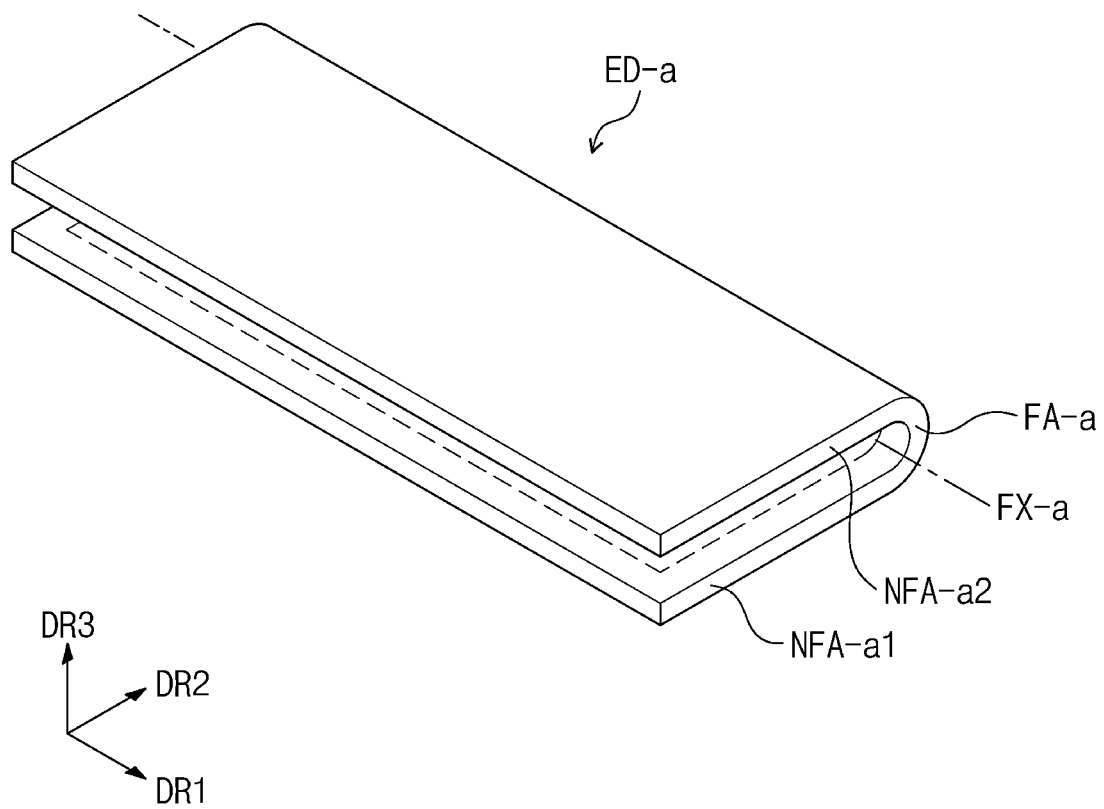
FIG. 4 is a view illustrating the display device shown in FIG. 3 in a folded state.
Figure 5:
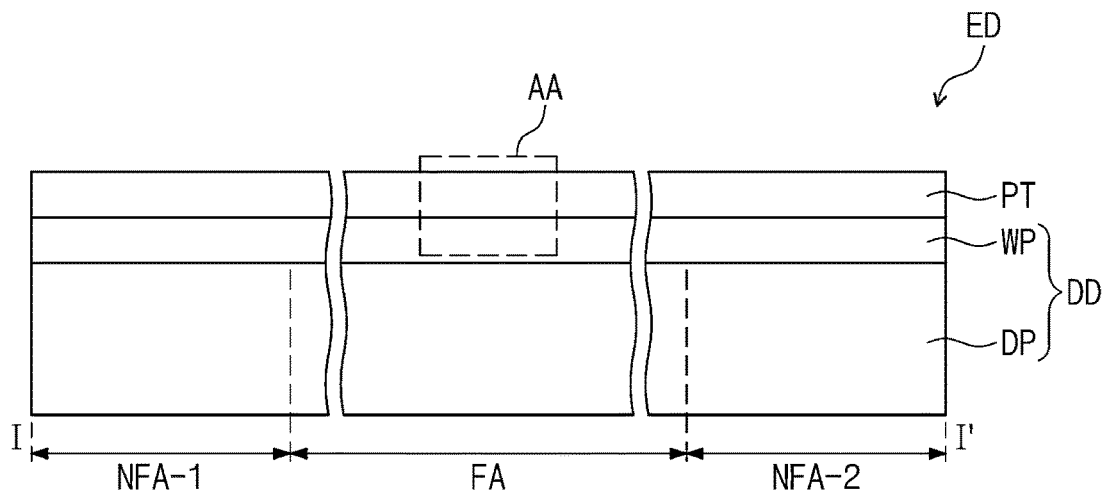
FIG. 5 is a cross-sectional view of a display device according to an embodiment of the invention.

FIG. 1 is a perspective view of a display device according to an embodiment of the invention. FIG. 2 is a view illustrating the display device shown in FIG. 1 in a folded state, FIG. 3 is a perspective view of a display device according to an alternative embodiment of the invention, and FIG. 4 is a view illustrating the display device shown in FIG. 3 in a folded state. FIG. 5 is a cross-sectional view of a display device according to an embodiment of the invention.

An embodiment of a display device ED may be used in large-sized electronic devices such as televisions and monitors and in small-and-medium-sized electronic devices such as mobile phones, tablet computers, car navigation systems, game machines, and smart watches. In FIG. 1 to FIG. 4, embodiments where the display device ED is a smart phone is exemplary illustrated. However, the embodiment of the invention is not limited thereto.

Referring to FIG. 1, an embodiment of the display device ED may have a rectangular shape which has long sides extending in a first direction axis DR1 direction and short sides extending in a second direction axis DR2 direction which crosses the first direction axis DR1. However, an embodiment of the invention is not limited thereto. The display device ED may have various shapes on a plane, such as a circular shape and a polygonal shape. The display device ED may be a flexible display device.

In an embodiment of the display device ED, a display surface DS on which an image IM is displayed may be parallel to a plane defined by the first direction axis DR1 and the second direction axis DR2. The normal direction of the display surface DS, that is, the thickness direction of the display device ED is indicated by a third direction axis DR3. A front surface (or an upper surface) and a back surface (or a lower surface) of each member are defined by the third direction axis DR3. However, directions indicated by the first to third direction axes DR1, DR2, and DR3 are a relative concept, and may be converted to different directions. Hereinafter, first to third directions refer to the same directions indicated by the first to third direction axes DR1, DR2, DR3, respectively, and labeled as the same reference numerals.

An embodiment of the display device ED may include a folding region FA and non-folding regions NFA-1 and NFA-2. Referring to FIG. 1 and FIG. 2, an embodiment of the display device ED may include the folding region FA and a plurality of non-folding regions NFA-1 and NFA-2. The folding region FA is disposed between the non-folding regions NFA-1 and NFA-2, and the folding region FA and the non-folding regions NFA-1 and NFA-2 may be arranged adjacent to each other in the first direction axis DR1 direction.

The folding region FA may be a portion deformable into a folded shape along a folding axis FX extending in the direction of the second direction axis DR2. The folding region FA may have a radius of curvature RD of about 5 millimeters (mm) or less. An embodiment of the display device ED may be folded to have a radius of curvature in a range of about 1 mm to about 5 mm along the at least one folding axis FX.

FIG. 1 and FIG. 2 show an embodiment where one folding region FA and two non-folding regions NFA-1 and NFA-2 are defined. However, the number of the folding region FA and the non-folding regions NFA-1 and NFA-2 is not limited thereto. In one alternative embodiment, for example, the display device ED may include a plurality of non-folding regions NFA-1 and NFA-2, which is more than two, and a plurality of folding regions FA disposed between the non-folding regions NFA-1 and NFA-2.

In an embodiment of the display device ED, the non-folding regions NFA-1 and NFA-2 may be disposed to be symmetrical to each other based on the folding region FA. However, an embodiment of the invention is not limited thereto. While the folding region FA is disposed between the non-folding regions NFA-1 and NFA-2, the areas of the two non-folding regions NFA-1 and NFA-2 facing each other based on the folding region FA may be different from each other.

The display surface DS of the display device ED may include a display region DA and a non-display region NDA around the display region DA. The display region DA displays an image and the non-display region NDA may not display an image. The non-display region NDA surrounds the display region DA, and may define the edge of the display device ED.

Referring to FIG. 2, an embodiment of the display device ED may be a folding-type (foldable) display device ED which is folded or unfolded. In one embodiment, for example, the folding region FA may be bent along the folding axis FX which is parallel to the second direction axis DR2, so that the display device ED may be folded. The folding axis FX may be defined as a short axis which is parallel to a short side of the display device ED.

When the display device ED is folded, the non-folding regions NFA-1 and NFA-2 face each other, and the display device ED may be in-folded such that the display surface DS is not exposed to the outside (i.e., an in-folding manner). However, the embodiment of the invention is not limited thereto. In such an embodiment, the display device ED may be out-folded such that the display surface DS is exposed to the outside (i.e., an out-folding manner).

In an alternative embodiment, the folding region FA may be bent along the folding axis FX which is parallel to the first direction axis DR1 as shown in FIG. 3. Except for a folding operation, an embodiment of a display device ED-a illustrated in FIG. 3 may have substantially the same configuration as that of the display device ED illustrated in FIG. 1. Therefore, hereinafter, the folding operation of the display device ED-a illustrated in FIG. 3 and FIG. 4 will be mainly described, and any repetitive detailed description of other features thereof will be omitted or simplified.

Referring to FIG. 3 and FIG. 4, an embodiment of the display device ED-a may include a folding region FA-a and a plurality of non-folding regions NFA-a1 and NFA-a2. The folding region FA-a is disposed between the non-folding regions NFA-a1 and NFA-a2, and the folding region FA-a and the non-folding regions NFA-a1 and NFA-a2 may be arranged adjacent to each other in the second direction axis DR2.

The folding region FA-a may be bent along a folding axis FX-a which is parallel to the first direction axis DR1, so that the display device ED-a may be folded. The folding axis FX-a may be defined as a long axis which is parallel to a long side of the display device ED-a. The display device ED illustrated in FIG. 1 may be folded along a short axis, whereas the display device ED-a illustrated in FIG. 3 may be folded along a long axis. In FIG. 4, the display device ED-a is illustrated as being in-folded such that a display surface DS is not exposed to the outside. However, the embodiment of the invention is not limited thereto. The display device ED-a is folded along the long axis and may be out-folded.

In an embodiment, as shown in FIG. 1 to FIG. 4, the display device ED and ED-a may be a foldable display device, but the embodiment of the invention is not limited thereto. An embodiment of a display device may be a flexible display device which may be foldable or bendable or which may be maintained to be in the folded state or the bent state. In the present specification, being flexible refers to having properties of being able to be bent, which is not limited to being able to be bent and completely folded, but includes being able to be bent to a degree of a few nanometers (nm).

Figure 6:
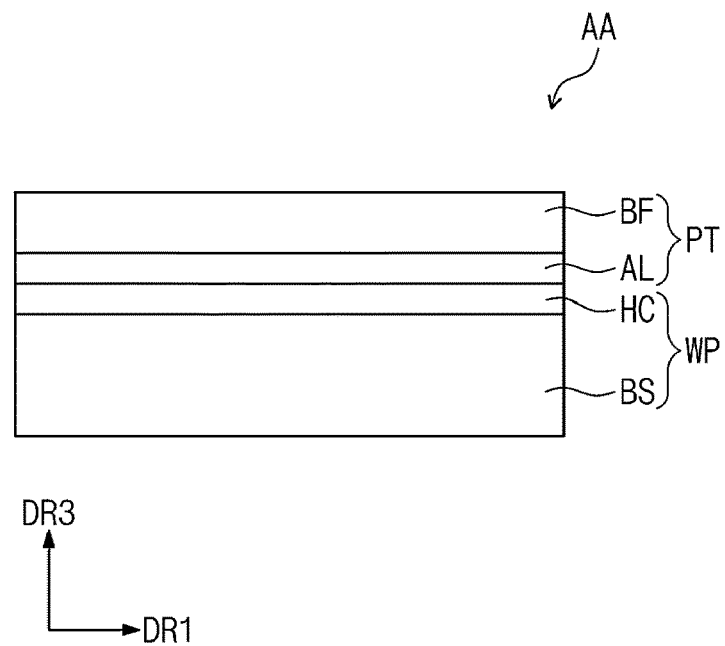
FIG. 6 is a cross-sectional view showing region AA of FIG. 5.
Figure 7:
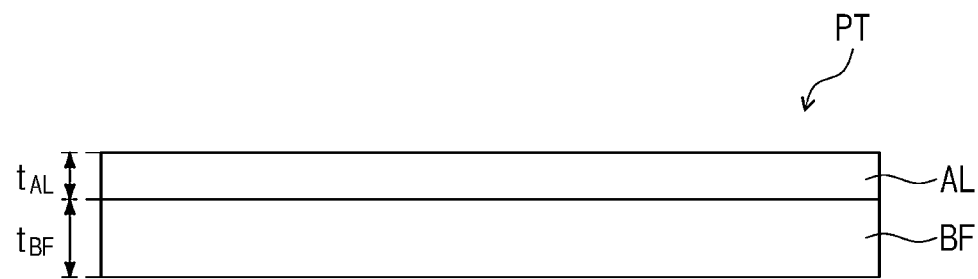
FIG. 7 is a cross-sectional view of a protective tape according to an embodiment of the invention.
Figure 8:
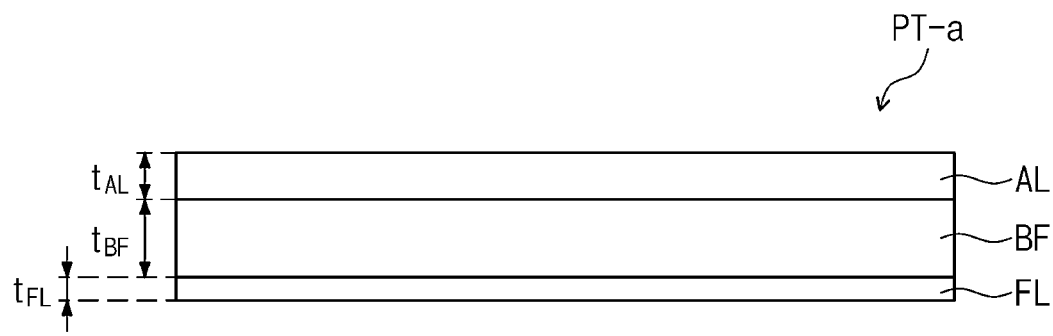
FIG. 8 is a cross-sectional view of a protective tape according to an embodiment of the invention.

FIG. 5 is a cross-sectional view of a display device according to an embodiment, and FIG. 5 shows a portion corresponding to line I-I' of FIG. 1, and FIG. 6 is a cross-sectional view corresponding to region AA of FIG. 5. FIG. 7 and FIG. 8 are each a cross-sectional view of a protective tape according to an embodiment of the invention.

FIG. 5 and FIG. 6 are cross-sectional views of the display device ED according to an embodiment of the invention illustrated in FIG. 1 and FIG. 2, but the embodiment of the invention is not limited thereto. Hereinafter, the description of a display device and a protective tape with reference to FIG. 5 to FIG. 8 may be equally applied to the display device ED-a illustrated in FIG. 3 and FIG. 4.

An embodiment of the display device ED may include a display module DD and a protective tape PT disposed on the display module DD The protective tape PT may be applied to the display module DD to protect the surface of the display module DD. The protective tape PT is transparent. Therefore, even when the protective tape PT is attached, image information displayed on the display surface DS (see FIG. 1) of the display module DD may be visible. In such an embodiment, the protective tape PT does not maintain permanent adhesion force for the surface of the display module DD. The protective tape PT has attachment properties to a degree in which, when the protective tape PT is removed by a user, an adhesive layer AL of the protective tape PT is easily detached without leaving a residue onto the surface of the display module DD. In one embodiment, for example, in the protective tape PT, the adhesive layer AL may be a pressure sensitive adhesive ("PSA") layer.

FIG. 7 and FIG. 8 are cross-sectional views respectively showing protective tapes PT and PT-a according to an embodiment. Referring to FIG. 7, the protective tape PT includes a base film BF and the adhesive layer AL disposed on the base film BF. The adhesive layer AL is disposed adjacent to the display module DD, and the adhesive layer AL may be disposed between the display module DD and the base film BF.

In an embodiment of the protective tape PT, the adhesive layer AL may have a storage modulus of less than about 0.3 megapascal (MPa) at about −20° C. and a creep value of about 50% or greater at about 60° C. Herein, the creep value is defined as a creep value at about 60° C., which is a value when a shear stress of about 2000 pascal (Pa) is maintained for about 10 minutes at about 60° C.

An embodiment of the protective tape PT includes the adhesive layer AL having a viscosity elasticity of less than about 0.3 MPa at about −20° C. and a creep value of about 50% or greater at about 60° C., and thus, is capable of maintaining high adhesion and high durability even when the display device ED is repeatedly bent or folded so that the shape thereof is deformed. In such an embodiment of the protective tape PT, even when the shape of the display device ED is repeatedly deformed, the stress at the time of the shape deformation is relaxed in the adhesive layer AL, so that the adhesive layer AL may not be pushed or whitened.

Herein, the storage modulus of the adhesive layer AL of the protective tape PT corresponds to a value measured using a Rheometer (TA Instrument Co., Ltd.). A sample for the storage modulus measurement was prepared by processing the adhesive layer AL in the form of a disk having a diameter of about 8 millimeters (mm) and a thickness of about 800 mm. The storage modulus was measured by applying a frequency of about 1 hertz (Hz) and a torque of about 200 millinewton-meter (mN·m) in the Rheometer and increasing the temperature at a rate of about 3° C./min while applying a normal force of about 0.5 newton (N).

Herein, the creep value of the adhesive layer AL was measured at about 60° C. using a Thermomechanical Analysis ("TMA") (Netzsch Co., Ltd.). For the creep measurement, an adhesive layer AL sample was prepared to a thickness of about 800 micrometers (μm) and a diameter of about 8 mm, and a strain rate (%) was measured after maintaining a shear stress of about 2000 Pa for 10 minutes in the adhesive layer AL.

In an embodiment of the protective tape PT, the adhesive layer AL may include a silicon-based resin, an acrylic resin, or a urethane-based resin. The adhesive layer AL may include or be formed of a polymer resin including a silicon-based resin, an acrylic resin, or a urethane-based resin. In one embodiment, for example, the adhesive layer AL may include or be formed of an acrylic resin.

In an embodiment of the protective tape PT, the adhesive layer AL may further include an adhesion force control agent. The adhesion force control agent may be a surface modifier. In one embodiment, for example, the adhesion force control agent may be a low molecular weight material, the adhesion force control agent may be a silicon-containing material.

In an embodiment of the protective tape PT, the base film may be a polymer film including at least one selected from polyethyleneterephthalte ("PET"), poly(butylene terephthalate) ("PBT"), polyethylene naphthalene ("PEN"), polycarbonate ("PC"), poly(methylmethacrylate ("PMMA"), polystyrene ("PS"), polyvinylchloride ("PVC"), polyethersulfone ("PES"), polypropylene ("PP"), polyamide ("PA"), modified polyphenylene ether ("m-PPO"), polyoxymethylene ("POM"), polysulfone ("PSU"), polyphenylene sulfide ("PPS"), polyimide ("PI"), polyethyleneimine ("PEI"), polyether ether ketone ("PEEK"), polyamide imide ("PAI"), polyarylate ("PAR") and thermoplasitc polyurethane ("TPU").

In one embodiment, for example, in the protective tape PT, the base film BF may be a PET film or a TPU film. In an embodiment, the base film BF may be a PET film not having a phase delay.

In an embodiment of the protective tape PT, the base film BF may have a thickness $t_{BF}$ in a range of about 30 μm to about 60 μm. If the thickness of the base film BF is less than about 30 μm, durability for protecting the surface of the display module DD may be deteriorated. Also, if the thickness of the base film BF is greater than about 60 μm, the thickness of the entire display device ED is increased, so that folding properties may be deteriorated.

In an embodiment of the protective tape PT, the adhesive layer AL may have a thickness $t_{AL}$ of about 30 μm or less. In an embodiment of the protective tape PT, where the thickness $t_{AL}$ of the adhesive layer AL is about 30 μm or less, the protective tape PT attached to the display module DD exhibits a similar behavior to that of a window WP. Therefore, even during repeated folding, a phenomenon in which the protective tape PT is lifted in the window WP may be minimized.

In one embodiment, for example, the thickness $t_{AL}$ of the adhesive layer AL of the protective tape PT may be in a range of about 25 μm to about 30 μm. If the thickness of the adhesive layer AL is less than about 25 μm, the adhesion force of the protective tape PT for the display module DD may be deteriorated. Also, if the thickness of the adhesive layer AL is greater than about 30 μm, the thickness of the entire display device ED is increased, so that folding properties may be deteriorated.

Referring to FIG. 8, in an alternative embodiment, the protective tape Pt-a may further include a surface treatment layer FL disposed on the base film BF. The surface treatment layer FL is a layer exposed to outside as an outermost surface of the display devices ED and ED-a, and may include, for example, an anti-fingerprint coating layer, an anti-static coating layer, and the like. Such an embodiment illustrated in FIG. 8 is substantially the same as the embodiment of FIG. 7 except that the protective tape PT-a according to further includes the surface treatment layer FL, and any repetitive detailed description of the same or like elements describe above with reference to FIG. 7 thereof will be omitted. Such an embodiment of the protective tape PT-a illustrated in FIG. 8 may be included in the above-described display devices ED and ED-a.

Referring back to FIG. 5 and FIG. 6, an embodiment of the display module DD includes the display panel DP and the window WP, and the window WP may include a base layer BS. In an embodiment, the window WP may further include a functional layer HC disposed on the base layer BS. In one embodiment, for example, the functional layer HC may be a hard coating layer. However, the embodiment of the invention is not limited thereto. The functional layer HC may include an anti-fingerprint layer, an anti-scattering layer, or the like. The base layer BS may include a polymer film including a glass substrate, or a polymer resin.

In one embodiment, for example, a polymer film may be used as the base layer BS of the window WP. In one embodiment, for example, the base layer BS of the window WP may be a PI film.

In an embodiment of the display device ED, the adhesive layer AL of the protective tape PT may be attached to the window WP. In an embodiment of the display device ED, the adhesive layer AL of the protective tape PT may be attached to the window WP including a polymer film as the base layer BS. In one embodiment, for example, the window WP may include a PI film as the base layer BS and may include a hard coating layer as the functional layer HC, and the adhesive layer AL may be disposed directly on the hard coating layer. In such an embodiment, the adhesive layer AL of the protective tape PT may be attached to the hard coating layer which is the functional layer HC of the window WP.

In an embodiment of the display device ED, where the window WP includes a polymer film as the base layer BS, the adhesive layer AL may have a storage modulus of less than about 0.1 MPa at about −20° C. and a creep value of about 100% or greater when a sheer stress of about 2000 Pa is maintained for about 10 minutes at about 60° C.

In such an embodiment, the display device ED including the window WP having a polymer film as the base layer BS has a low storage modulus value at low temperatures, and may exhibit high reliability properties by including the protective tape PT including the adhesive layer AL having a creep value of about 100% or greater at a high temperature, thereby maintaining high attachment properties even during a folding operation.

Figure 9:
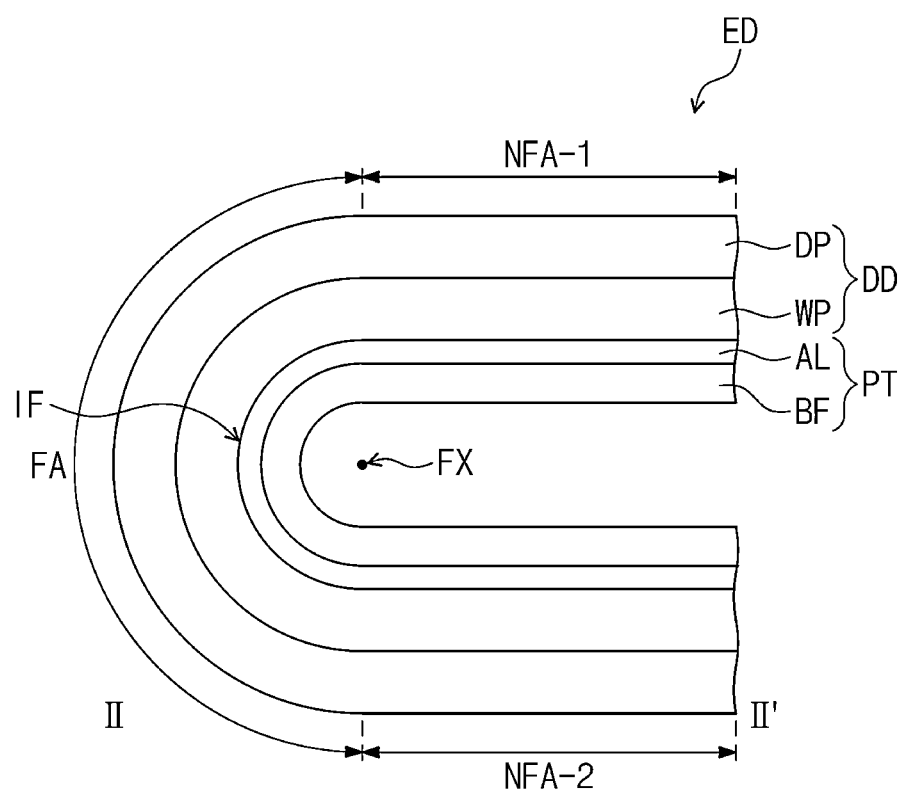
FIG. 9 is a cross-sectional view of a display device according to an embodiment of the invention.
Figure 9:
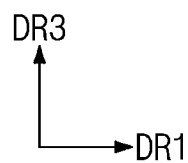

FIG. 9 is a cross-sectional view showing the display device ED in a folded state. FIG. 9 may be a portion corresponding to line II-IF of FIG. 2. FIG. 9 shows the display device ED in an in-folded state. The display device ED may include the folding region FA which is deformable into a shape folded along the folding axis FX.

In the folding region FA, the display device ED may maintain a high contact state at an interface IF between the protective tape PT and the display module DD since the adhesive layer AL has a storage modulus of less than about 0.1 MPa at about −20° C. and a creep value of about 100% or greater when a sheer shear stress of about 2000 Pa is maintained for about 10 minutes at about 60° C., thereby relaxing stress provided to the interface IF between the protective tape PT and the display module DD in the folding region FA.

Table 1 below shows the evaluation of the folding reliability in an embodiment of the display device ED. In Table 1, the folding reliability properties in the display device ED of Comparative Examples and Examples including the protective tape PT having different physical properties of the adhesive layer AL were evaluated and shown. The folding environmental reliability evaluation was determined by whether or not detachment of the protective tape PT occurred during a folding operation under each reliability test condition. Among the folding environmental reliability items, "low temperature" means that a folding test was performed at −20±3° C., "high temperature and high humidity" means that a folding test was performed at 60±3° C. and 90-95% RH, and "acceleration" means that a folding test was performed by periodically repeating the conditions of 10±3° C., 60±3° C., and 90-95% RH. Herein, RH denotes a relative humidity.

TABLE 1

| Items | | Comparative Example 1-1 | Comparative Example 1-2 | Example 1-1 | Example 1-2 |
|---|---|---|---|---|---|
| Storage modulus (MPa) | −20° C. | 0.2 | 0.1 | 0.09 | 0.08 |
| | 60° C. | 0.02 | 0.019 | 0.019 | 0.015 |
| Creep (%) | 60° C. | 103 | 110 | 110 | 160 |
| Folding environment reliability | Low-temperature properties | NG | NG | OK | OK |
| | High-temperature and high-humidity | NG | OK | OK | OK |
| | Acceleration | NG | NG | OK | OK |

In Table 1, "NG" refers to a case in which a protective tape is detached from a display module during a folding test, and "OK" refers to a case in which a protective tape maintains adhesion force to a display module without the deformation thereof even after a folding test. The display module used in Table 1 corresponds to a case in which a polymer film is included as a base layer in a window.

Referring to the results of Table 1, Examples according to an embodiment of the invention, in which the storage modulus of a protective tape adhesive layer is less than about 0.1 MPa at about −20° C. and the creep value thereof is about 100% or greater at about 60° C., showed high folding environmental reliability properties. In comparison, Comparative Examples, in which the storage modulus value at a low temperature of about −20° C. is about 0.1 MPa or greater, showed deteriorated folding reliability compared to Examples.

That is, in an embodiment, where a window includes a polymer film as a base layer, an adhesive layer of a protective tape exhibits high bending properties by having a storage modulus of less than about 0.1 MPa at about −20° C. and a creep value of about 100% or greater at about 60° C., so that a display device may exhibit improved folding reliability.

In an embodiment, the protective tape PT of the display device ED is desired to exhibit high attachment properties in a general environment in which the display device ED is used, and when the protective tape PT is replaced, the protective tape PT is desired to be removed from the display module DD without leaving any residues of the adhesive layer AL. That is, the adhesive layer AL is desired to exhibit high bendability and adhesion properties to allow the protective tape PT to exhibit high adhesion force for the entire display module DD, while ensuring replacement properties.

In such an embodiment, it is desired that the maximum adhesion force of the adhesive layer AL is expressed within a short time after the protective tape PT is attached to the display module DD to allow the protective tape PT to exhibit high bendability and high adhesion properties.

An embodiment of the display device ED may exhibit improved reliability properties by including the protective tape PT having a reference adhesion force of about 200 gram-force per inch (gf/in) or greater. Herein, the reference adhesion force corresponds to either an initial adhesion force measured when about 30 minutes or more have elapsed after a protective tape is attached to a window at a room temperature, or to a first high-temperature adhesion force value measured when about 10 minutes or more have elapsed after a protective tape is attached to the window at about 60° C. Herein, the room temperature may be a temperature in a range of about 15° C. to about 25° C. or about 20° C. to about 25° C.

Herein, adhesion force corresponds to a value measured by a 180° peel test method. Herein, the adhesion force corresponds to an average value of adhesion force measured by attaching an adhesive layer to an adherend and performing a 180° peel test at a rate of about 300 millimeters per minute (mm/min) after a predetermined period of time has elapsed.

In an embodiment where the base layer BS of the window WP included in the display device ED includes a polymer film, the reference adhesion force of the protective tape PT is about 200 gf/in, and in such an embodiment, the adhesion force corresponds to an adhesion force value of the protective tape PT having a hard coating layer as an adherend in the window WP including the hard coating layer as the functional layer HC.

Figure 10A:
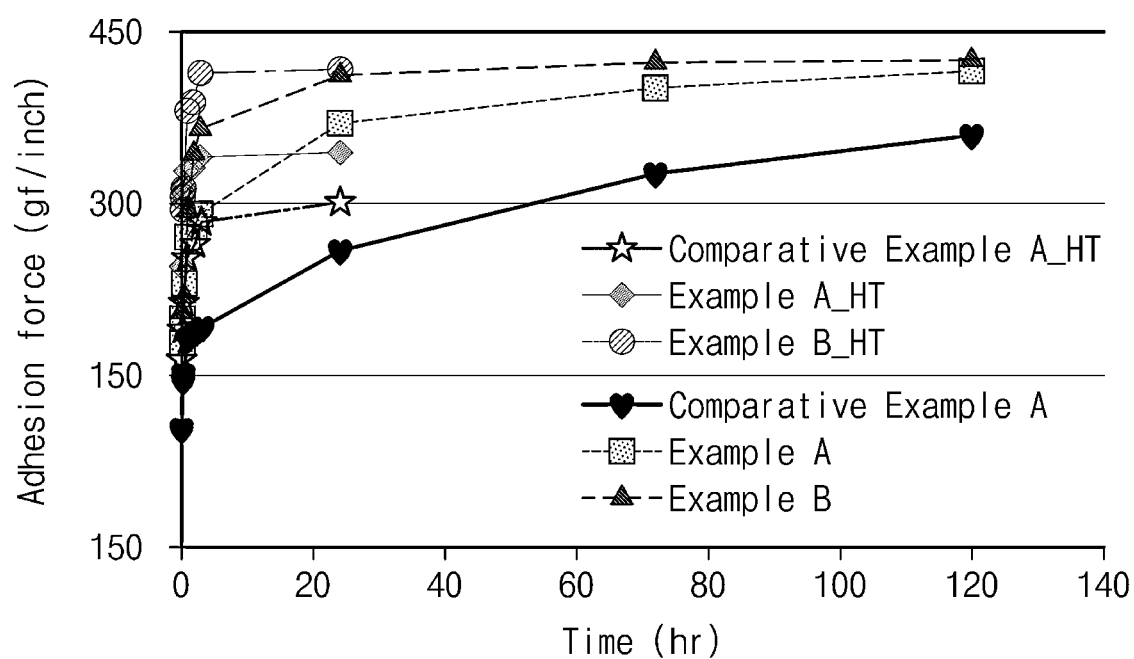
FIG. 10A and FIG. 10B are graphs showing the change in adhesion force values over time in Comparative Examples and Examples.
Figure 10B:
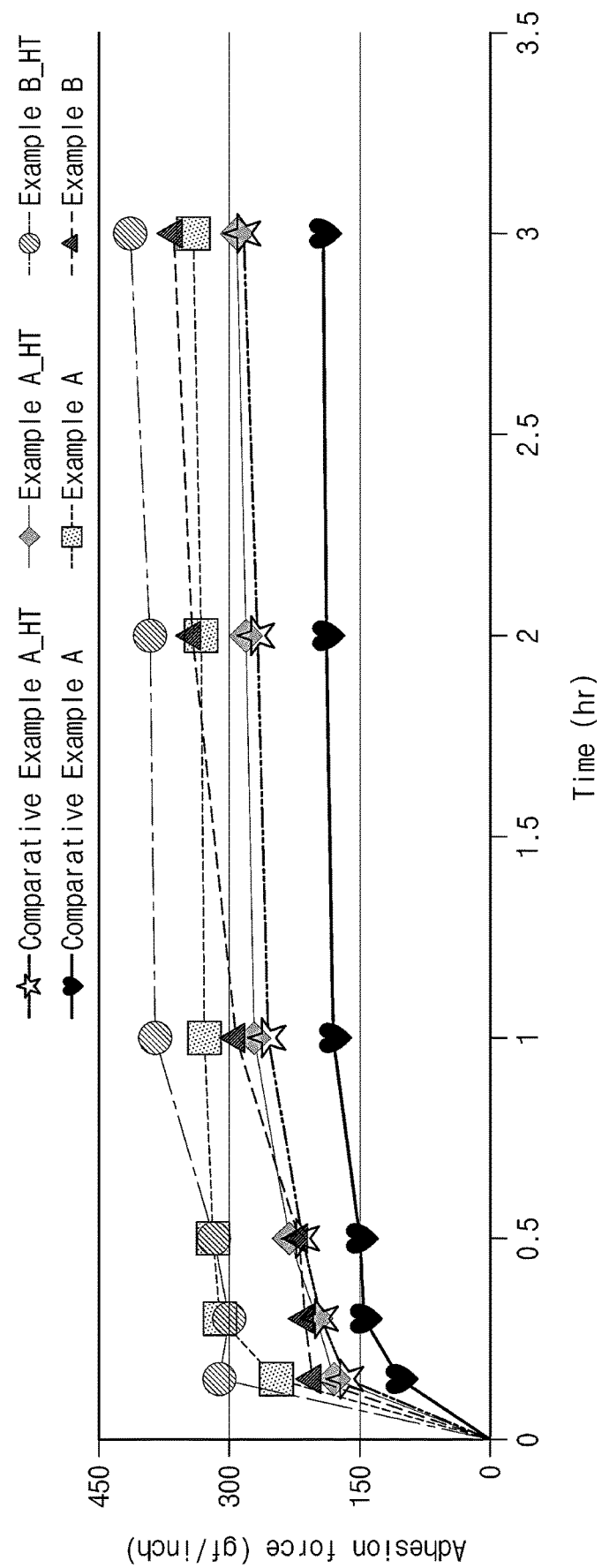

Table 2 shows the evaluation results of adhesion force values and folding properties over time after a protective tape is attached under the conditions of a room temperature and about 60° C. In addition, FIG. 10A and FIG. 10B are graphs showing the change in adhesion force values of the protective tape PT to the window WP over time. FIG. 10B is an enlarged view of evaluation results within about 3 hours in FIG. 10A.

TABLE 2

| | Room temperature | | | 60° C. | | |
|---|---|---|---|---|---|---|
| Duration (hr) | Comparative Example A | Example A | Example B | Comparative Example A_HT | Example A_HT | Example B_HT |
| 0 | 0 (NG) | 0 (NG) | 0 (NG) | 0 (NG) | 0 (NG) | 0 (NG) |
| 0.15 | 103 (NG) | 179 (NG) | 204 (NG) | 167 (NG) | 250 (OK) | 311 (OK) |
| 0.3 | 146 (NG) | 200 | 212 | 195 (NG) | 310 (OK) | 300 (OK) |
| 0.5 | 149 (NG) | 230 | 220 | 216 (NG) | 317 (OK) | 317 (OK) |
| 1 | 181 (NG) | 270 (OK) | 292 (OK) | 256 (OK) | 329 (OK) | 385 (OK) |
| 2 | 188 (NG) | 280 (OK) | 343 (OK) | 267 (OK) | 332 (OK) | 391 (OK) |
| 3 | 192 (NG) | 290 (OK) | 364 (OK) | 283 (OK) | 341 (OK) | 414 (OK) |
| 24 | 259 (OK) | 370 (OK) | 411 (OK) | 302 (OK) | 345 (OK) | 418 (OK) |

TABLE 2-continued

| | Room temperature | | | 60° C. | | |
|---|---|---|---|---|---|---|
| Duration (hr) | Comparative Example A | Example A | Example B | Comparative Example A_HT | Example A_HT | Example B_HT |
| 72 | 326 (OK) | 401 (OK) | 423 (OK) | | | |
| 120 | 360 (OK) | 415 (OK) | 425 (OK) | | | |
| 168 | 375 (OK) | 419 (OK) | 431 (OK) | | | |

Comparative Example A is a display device including a protective tape having an adhesive layer not satisfying the conditions of the low temperature (about −20° C.) storage modulus value and the creep value at about 60° C. in an embodiment of an adhesive layer according to the invention described above. Also, Examples A and B are display devices including a protective tape having an adhesive layer satisfying the conditions of the low temperature (about −20° C.) storage modulus of less than about 0.1 MPa and the creep value of about 100% or greater at about 60° C.

Comparative Example A_HT, Example A_HT, and Example B_HT have a same structure as the display device of each of Comparative Example A, Example A, and Example B, respectively, except for the protective tape attachment temperature among the devices.

Referring to Table 2 and the graphs of FIG. 10A and FIG. 10B, Comparative Example A showed an adhesion force value satisfying the range of the reference adhesion force after about 3 hours or more have elapsed under the room temperature condition. In comparison, Example A and Example B showed an adhesion force value satisfying the range of the reference adhesion force after about 30 minutes have elapsed at a room temperature. That is, when compared with the adhesive layer used in Comparative Example A, in Example A and Example B, the reference adhesion force was achieved within a short period of time, so that reliability was ensured when a display device was operated within a short period of time after a protective tape was attached.

Table 2 also shows the results of a folding test according to protective tape attachment time. In Table 2, "NG" refers to a case in which a protective tape is detached during a folding test, and "OK" refers to a case in which the attachment state of a protective tape is maintained well during a folding test.

Referring to Table 2, when the reference adhesion force value indicates an adhesion force value of about 200 gf/in or greater, the folding reliability was ensured, and it was confirmed that when compared with Comparative Example A, in Example A and Example B, the reference adhesion force was achieved by maintaining the adhesion time within about 30 minutes.

In Table 2, FIG. 10A, and FIG. 10B, Comparative Example A_HT showed an adhesion force value satisfying the range of the reference adhesion force after about 30 minutes or more have elapsed under the condition of about 60° C. In comparison, Example A_HT and Example B_HT showed an adhesion force value satisfying the range of the reference adhesion force after about 10 minutes have elapsed at about 60° C. That is, when compared with the adhesive layer used in Comparative Example A_HT, in Example A_HT and Example B_HT, the reference adhesion force was achieved within a short period of time, so that reliability was ensured when a display device was operated within a short period of time after a protective tape was attached.

In addition, when compared with Example A and Example B which exhibited adhesion force properties at a room temperature, it was confirmed that the adhesion force was rapidly increased under the condition of about 60° C. That is, when the protective tape PT is attached at a room temperature in a process of assembling the display device ED, the reference adhesion force value may be reached after about 30 minutes, and when attached at about 60° C., the reference adhesion force value may be reached after about 10 minutes.

In an embodiment of the display device ED, when attached under the temperature conditions of a room temperature (e.g., about 25° C.) or about 60° C., the protective tape PT exhibits sufficient adhesion force to a window of the display module DD within a short time of about 30 minutes or less, so that the folding reliability of the protective tape PT in the display device ED may be ensured in a short period of time.

Figure 11:
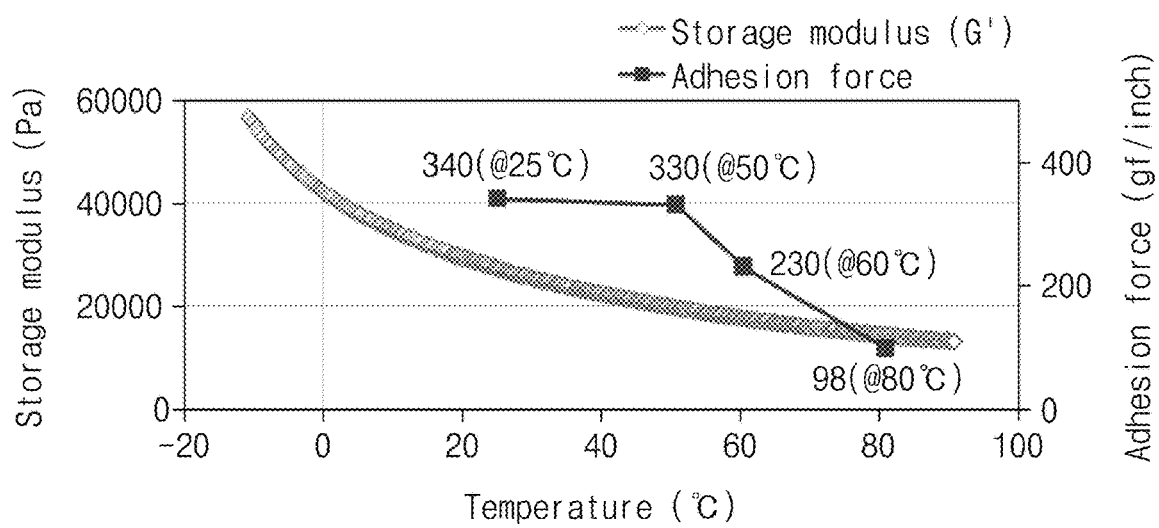
FIG. 11 is a graph showing the adhesion force and storage modulus in an embodiment of the invention.

FIG. 11 is a graph showing the change in storage modulus and the change in adhesion force of the adhesive layer AL of the protective tape PT according to an increase in temperature. Table 3 shows the evaluation of an adhesion force value according to temperature and the ease of processing when replacing a protective tape.

TABLE 3

| | Protective tape adhesion force to window (gf/in) | | |
|---|---|---|---|
| Classification | 25° C. | 60° C. | 80° C. |
| Comparative Example 2 | 300 (X) | 200 (Δ) | 120 (Δ) |
| Example 2-1 | 340 (X) | 230 (Δ) | 98 (O) |
| Example 2-2 | 410 (X) | 190 (Δ) | 77 (O) |

The measurement results disclosed in Table 3 and FIG. 11 show the results when the protective tape PT was detached after the protective tape PT exerted sufficient adhesion force to the window of the display module DD. The temperature of about 25° C., about 50° C., about 60° C., about 80° C., and the like at which adhesion force was measured is the temperature at which the protective tape PT was detached from the window WP. Also, in Table 3, "X" refers to a case in which the peel force at the time of detachment is great and there is a residue on the surface of a window after a protective tape is detached. "Δ" corresponds to a case in which there is no residue on the surface of a window after a protective tape is detached but the peel force at the time of the detachment of the protective tape is great, so that a detachment process is not easily performed. Also, "O" corresponds to a case in which a protective tape is easily detached without leaving a residue on the surface of a window. Meanwhile, the adhesive layer of the protective tape evaluated in FIG. 11 corresponds to the same configuration as Example 2-1.

Referring to FIG. 11, it can be seen that as the temperature was increased, the storage modulus value of the adhesive layer AL was decreased. In addition, it was confirmed that as the detachment temperature was increased, the peel force which is adhesion force for detaching the protective tape PT was decreased.

Referring to the results of Table 3 and FIG. 11, at a detachment temperature of about 80° C., Example 2-1 and Example 2-2 exhibited an adhesion force value of about 100 gf/in or less, and were removed without leaving a residue on the surface of the window WP. That is, it can be seen that when the adhesion force of the protective tape PT to the surface of the window WP is reduced to about 100 gf/in or less, the protective tape PT is easily detached from the surface of the window WP without leaving a residue.

In an embodiment of the display device ED, the protective tape PT may be easily detached under high temperature conditions. In one embodiment, for example, the protective tape PT may be detached at a temperature of about 50° C. to about 80° C.

In an embodiment of the display device ED, the maintenance adhesion force of the protective tape PT to the window WP and the detachment adhesion force of the protective tape PT to the window WP may satisfy the following relation: (Detachment adhesion force)/(Maintenance adhesion force)<0.5.

In the relation above, the maintenance adhesion force corresponds to either adhesion force measured when about 30 minutes have elapsed after the protective tape PT is attached to the window WP at a room temperature or adhesion force measured when about 30 minutes have elapsed after the protective tape PT is attached to the window WP at a first temperature. Also, the detachment adhesion force corresponds to peel force measured when the protective tape PT is detached from the window WP at a second temperature.

Meanwhile, the first temperature is in a range of about 25° C. to about 70° C., and the second temperature is in a range of about 50° C. to about 80° C.

That is, in the case of the display device ED including the protective tape PT satisfying the condition of Equation 1, the protective tape PT may be easily removed under the second temperature condition.

Figure 12:
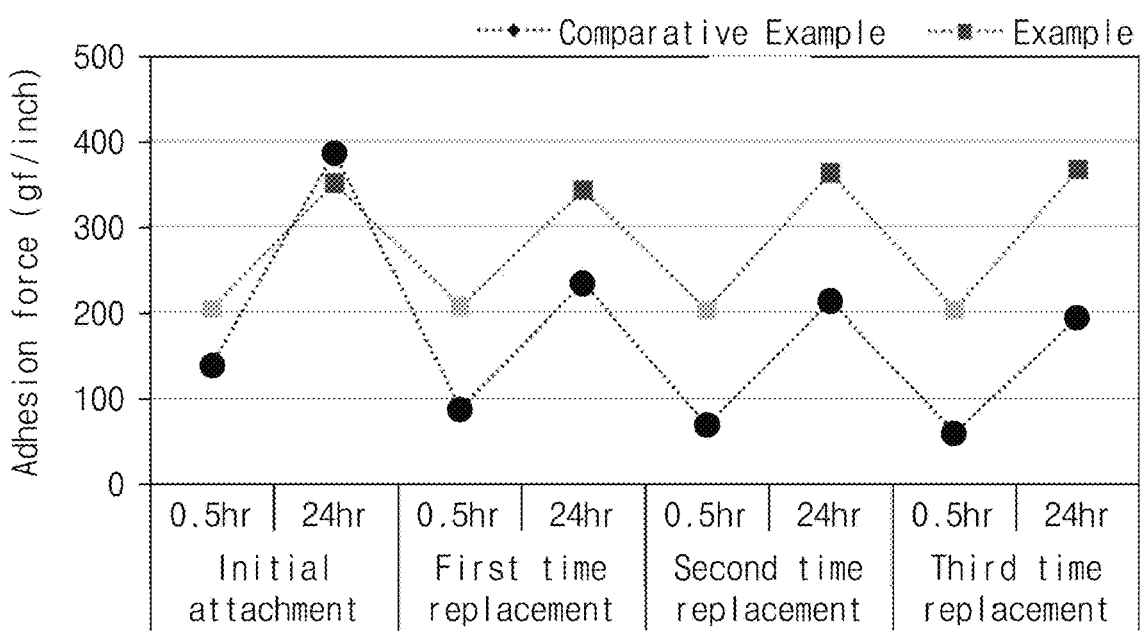
FIG. 12 is a graph for showing whether or not the adhesion force of a protective tape to a display panel is changed when the protective tape is replaced.

Table 4 and FIG. 12 show evaluation results for the reattachment properties of a protective tape. In the reattachment properties evaluation results shown in Table 4 and FIG. 12, "initial attachment" refers to adhesion force properties when the protective tape PT is attached to the display module DD for the first time. Also, "First time replacement" refers to a case in which a new protective tape is attached on the surface of the window WP of the same display module DD after detaching the protective tape PT initially attached. "Second time replacement" refers to the replacement of the protective tape for the second time, and shows the results of adhesion force to the surface of a window when a second new protective tape was applied after detaching an initial attachment tape and then detaching a first replacement tape when about 24 hours have elapsed after attaching the first replacement tape. Also, "third time replacement" refers to the time when the protective tape was replaced for the third time after the initial protection tape, the first and second replacement protection tapes were sequentially attached and detached.

TABLE 4

| Classification | Comparative Examples | | Examples | |
|---|---|---|---|---|
| | 0.5 hours | 24 hours | 0.5 hours | 24 hours |
| Initial attachment | 140 | 386 | 203 | 351 |
| First time replacement | 88 | 235 | 206 | 342 |
| Second time replacement | 70 | 213 | 202 | 362 |
| Third time replacement | 60 | 194 | 202 | 366 |

Referring to the results of Table 4 and FIG. 12, in the case of Comparative Example, it can be seen that as the number of replacement increased, the initial adhesion force value decreased, and the adhesion force value after about 24 hours had elapsed also decreased in accordance with the increase in the number of replacement of the protective tape. In comparison, in Example, even when the number of replacement increased, the initial adhesion force value of the protective tape and the adhesion force value thereof after about 24 hours had elapsed were similar to each other.

That is, the display device ED according to an embodiment includes the protective tape PT including the adhesive layer AL having a storage modulus of less than about 0.3 MPa at about −20° C. and a creep value of about 50% or greater when a shear stress of about 2000 Pa is maintained for about 10 minutes at about 60° C., thereby exhibiting high reliability when used, and may exhibit properties in that the protective tape PT is easily detached when the replacement thereof is required.

In an embodiment of the display device ED, the window WP may include a glass substrate as the base layer BS. In an embodiment of the display device ED, which is a flexible display device, the glass substrate used as the base layer BS of the window WP may have a thickness of about 300 μm or less.

In an embodiment of the display device ED, where the base layer BS of the window WP is a glass substrate, the adhesive layer AL of the protective tape PT may have a storage modulus of less than about 0.3 MPa at about −20° C. and a creep value of about 50% or greater when a sheer stress of about 2000 Pa is maintained for about 10 minutes at about 60° C.

The protective tape PT may exhibit high adhesion properties for the window WP having a glass substrate as the base layer BS. That is, in an embodiment of the display device ED, where the base layer BS of the window WP includes a glass substrate, the reference adhesion force which corresponds to either an initial adhesion force measured when about 30 minutes or more have elapsed after a protective tape is attached to a window at a room temperature, or to a first high-temperature adhesion force value measured when about 10 minutes or more have elapsed after a protective tape is attached to the window at about 60° C. may be greater when compared with a case in which a polymer film is used as the base layer BS of the window WP. In one embodiment, for example, the reference adhesion force may be about 200 gf/in.

In an embodiment, where the base layer BS of the window WP includes a glass substrate, the detachment adhesion force may be less than about 200 gf/in. The detachment adhesion force corresponds to peel force measured when the protective tape PT is detached from the window WP at a second temperature, and the second temperature may be in a range of about 50° C. to about 80° C.

In an embodiment of the display device ED, the window WP may further include an anti-fingerprint layer as the functional layer HC. In an embodiment where the window WP includes the functional layer HC, the adhesive layer AL of the protective tape PT may be attached to the functional layer HC.

In one embodiment of the display device ED, for example, the window WP includes a glass substrate as the base layer BS and includes an anti-fingerprint layer as the functional layer HC. In such an embodiment, the reference adhesion force of the protective tape PT may be about 20 gf/in. In such an embodiment, where the display device ED includes the window WP including a glass substrate, improved reliability properties may be exhibited in the case in which the reference adhesion force of the protective tape PT is about 20 gf/in or greater.

An embodiment of a display device includes a protective tape having an adhesive layer with a low storage modulus value of less than about 0.3 MPa at about −20° C. and a creep value of about 50% or greater at about 60° C. to allow the protective tape to maintain high adhesion force even during repeated folding operations, so that improved reliability and durability may be exhibited. In such an embodiment, a display device uses a protective tape including an adhesive layer having a low storage modulus and a high creep value, so that the surface of a display module may be protected. That is, even when the shape of the display device is deformed by being folded or bent, the surface of the display module may be protected by the protective tape without damage to the protective tape. In such an embodiment, the detachment of the protective tape from the display module may be improved.

In an embodiment, a display device includes a protective tape including an adhesive layer which is rapidly increased to a reference adhesion force value at the time of attachment and which has an adhesion force value to be easily removed under detachment conditions, thereby maintaining effective attachment force of the protective tape in a daily use environment and easily removing the protective tape and applying a new protective tape at the time of replacement of the protective tape, so that improved reliability properties may be exhibited.

An embodiment of the invention may provide a display device including a protective tape maintaining high attachment properties even with repeated folding by including an adhesive layer having a low storage modulus and high creep properties.

In addition, an embodiment of the invention may provide a display device including a protective tape capable of being easily detached and attached under high temperature conditions by having a reduced adhesion force value at a certain temperature or above while having a low storage modulus and high creep properties.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display device comprising:
   a display module foldable along a folding axis; and
   a protective tape disposed on the display module, wherein the protective tape comprises a base film and an adhesive layer disposed between the base film and the display module,
   wherein the adhesive layer has a storage modulus of less than about 0.3 MPa at about −20° C. and a creep value of about 50% or greater when a shear stress of about 2000 Pa is maintained for about 10 minutes at about 60° C.

2. The display device of claim 1, wherein the display module comprises:
   a display panel; and
   a window disposed on the display panel, wherein the window comprises a polymer film,
   wherein the adhesive layer is disposed on the window, and the storage modulus of the adhesive layer is less than about 0.1 MPa, and the creep value of the adhesive layer is about 100% or greater.

3. The display device of claim 2, wherein
   the window further comprises a hard coating layer disposed on the polymer film, and
   the adhesive layer is disposed directly on the hard coating layer.

4. The display device of claim 3, wherein
   an initial adhesion force of the protective tape to the window is about 200 gf/in or greater, wherein the initial adhesion force is an adhesion force value measured when about 30 minutes have elapsed after the protective tape is attached to the window at a room temperature.

5. The display device of claim 3, wherein
   a first high-temperature adhesion force of the protective tape to the window is about 200 gf/in or greater, wherein the first high-temperature adhesion force is an adhesion force value measured when about 10 minutes have elapsed after the protective tape is attached to the window at about 60° C.

6. The display device of claim 3, wherein a second high-temperature adhesion force of the protective tape to the window is less than about 100 gf/in, wherein the second high-temperature adhesion force is a peel force value measured when the protective tape is detached from the window at about 80° C.

7. The display device of claim 3, wherein a maintenance adhesion force of the protective tape to the window and a detachment adhesion force of the protective tape to the window satisfy the following relation:

(Detachment adhesion force)/(Maintenance adhesion force)<0.5, wherein the maintenance adhesion force is either adhesion force measured when about 30 minutes have elapsed after the protective tape is attached to the window at a room temperature or adhesion force measured when about 30 minutes have elapsed after the protective tape is attached to the window at a first temperature, and
the detachment adhesion force is a peel force measured when the protective tape is detached from the window at a second temperature,
wherein the first temperature is in a range of about 25° C. to about 70° C., and the second temperature is in a range of about 50° C. to about 80° C.

8. The display device of claim 1, wherein the display module comprises:
a display panel; and
a window disposed on the display panel, wherein the window comprises a glass substrate having a thickness of about 300 µm or less.

9. The display device of claim 8, wherein
the window further comprises an anti-fingerprint layer disposed on the glass substrate, and
an initial adhesion force of the protective tape to the window is about 20 gf/in or greater, wherein the initial adhesion force is an adhesion force value measured within about 30 minutes after the protective tape is attached to the window at a room temperature.

10. The display device of claim 8, wherein a detachment adhesion force of the protective tape to the window is less than about 200 gf/in, wherein the detachment adhesion force is a peel force value measured when the protective tape is detached from the window at about 80° C.

11. The display device of claim 1, wherein a thickness of the adhesive layer is in a range of about 25 µm to about 30 µm.

12. The display device of claim 1, wherein a thickness of the base film is in a range of about 30 µm to about 60 µm.

13. The display device of claim 1, wherein the adhesive layer comprises at least one of a silicon-based resin, an acrylic resin, or a urethane-based resin.

14. The display device of claim 13, wherein the adhesive layer further comprises an adhesion force control agent.

15. The display device of claim 1, wherein the base film comprises at least one of polyethyleneterephthalte, poly(butylene terephthalate), polyethylene naphthalene, polycarbonate, poly(methylmethacrylate), polystyrene, polyvinylchloride, polyethersulfone, polypropylene, polyamide, modified polyphenylene ether, polyoxymethylene, polysulfone, polyphenylene sulfide, polyimide, polyethyleneimine, polyether ether ketone, polyamide imide, polyarylate, or thermoplastic polyurethane.

16. The display device of claim 1, the display device is foldable in an in-folding manner or an out-folding manner along the folding axis.

17. The display device of claim 1, wherein the display module and the protective tape are folded with a radius of curvature in a range of about 1 mm to about 5 mm along the folding axis.

18. A display device foldable along a folding axis, comprising:
a display panel;
a window disposed on the display panel, wherein the window comprises a polymer film; and
a protective tape disposed on the window, wherein the protective tape comprises a base film and an adhesive layer disposed between the base film and the window,
wherein the adhesive layer has a storage modulus of less than about 0.1 MPa at about −20° C. and a creep value of about 100% or greater when a shear stress of about 2000 Pa is maintained for about 10 minutes at about 60° C.

19. The display device of claim 18, wherein the window further comprises a hard coating layer disposed on the polymer film, and the adhesive layer is disposed directly on the hard coating layer.

20. The display device of claim 19, wherein a maintenance adhesion force of the protective tape to the window and a detachment adhesion force of the protective tape to the window satisfy the following relation:

(Detachment adhesion force)/(Maintenance adhesion force)<0.5, wherein the maintenance adhesion force is either adhesion force measured when about 30 minutes have elapsed after the protective tape is attached to the window at a room temperature or adhesion force measured when about 30 minutes have elapsed after the protective tape is attached to the window at a first temperature, and
the detachment adhesion force is an adhesion force measured when the protective tape is detached from the window at a second temperature,
wherein the first temperature is in a range of about 25° C. to about 70° C. and the second temperature is in a range of about 50° C. to about 80° C.

\* \* \* \* \*